United States Patent [19]

Watanabe

[11] Patent Number: 5,438,376
[45] Date of Patent: Aug. 1, 1995

[54] IMAGE PROCESSING APPARATUS AND IMAGE RECEPTION APPARATUS USING THE SAME

[75] Inventor: Ikuo Watanabe, Kawasaki, Japan

[73] Assignee: Canon Kabushiki Kaisha, Tokyo, Japan

[21] Appl. No.: 320,821

[22] Filed: Oct. 6, 1994

Related U.S. Application Data

[63] Continuation of Ser. No. 175,683, Dec. 30, 1993, abandoned, which is a continuation of Ser. No. 627,018, Dec. 13, 1990, abandoned.

[30] Foreign Application Priority Data

Dec. 14, 1989 [JP] Japan .................................. 1-324587

[51] Int. Cl.⁶ .............................................. H04N 5/14
[52] U.S. Cl. ..................................... 348/714; 345/200; 365/221; 365/230.05
[58] Field of Search ................. 345/200, 190; 365/221, 365/230.05; 348/714, 523

[56] References Cited

U.S. PATENT DOCUMENTS

| | | | |
|---|---|---|---|
| 4,562,435 | 12/1985 | McDonough | 340/799 |
| 4,742,350 | 5/1988 | Ko et al. | 340/799 |
| 4,776,025 | 10/1988 | Hosoda | 358/160 |
| 4,891,788 | 6/1990 | Kreifels | 365/230.05 |
| 5,115,413 | 5/1992 | Sato et al. | 365/230.05 |

Primary Examiner—Curtis Kuntz
Assistant Examiner—Minsun Oh
Attorney, Agent, or Firm—Robin, Blecker, Daley & Driscoll

[57] ABSTRACT

An image reception/reproduction apparatus for reproducing an image from image information received from a transmission medium or a recording medium, comprises at least two frame memory means consisting of serial port random access memories, and memory control means for writing, in the other frame memory means, a signal read out from one frame memory means through a serial port at a video rate, wherein all contents of one frame memory can be copied to the other frame memory within a one-frame period. Even if the reception image is partially updated, an image updated within a period obtained by adding a one-frame intermemory copy period to a period required for transmitting the updated portion can be obtained.

17 Claims, 6 Drawing Sheets

IMAGE PROCESSING APPARATUS AND IMAGE RECEPTION APPARATUS USING THE SAME

This is a continuation of prior application Ser. No. 08/175,683 filed on Dec. 30, 1993, abandoned, which is a continuation of Ser. No. 07/627,618 filed on Dec. 13, 1990 abandoned.

BACKGROUND OF THE INVENTION

1. Field of the Invention

The present invention relates to an image processing apparatus and an image reception/reproduction apparatus using the same and, more particularly, to an image reception/reproduction apparatus for reproducing an image signal from image information received from a transfer medium or reproduction image information from a recording medium.

2. Related Background Art

An arrangement of a conventional image reception/reproduction apparatus used in a television conference system, a television telephone system, or the like is shown in FIG. 6. Image information from a satellite broadcast channel or a communication channel is converted into acompressed digital signal by a reception circuit 10 and is sequentially decoded into an expanded original image signal by a compressed image decoder 12. The image signal decoded by the decoder 12 is written in one of two frame memories 14 and 16 which is not used for monitor display. One of the two frame memories 14 and 16 is used for monitor display (read mode), and the other is used to write a reception image signal. The monitor display memory and the reception 1 image write memory are alternately switched. For example, upon completion of write access of the reception image signal to be written in the frame memory 14 the frame memory 14 then serves as a monitor display frame memory. Meanwhile, the next reception image signal is written in the frame memory 16.

Data read out at a video rate from the display frame memory to be displayed on a monitor 20 is converted into an analog signal by a D/A converter 18. A sync signal is added to the analog signal, and the resultant data is sent to the monitor 20, thereby displaying the reception image. A read address and read timing generation circuit 22 generates a display frame memory read address and a read timing signal.

The two frame memories are alternately used for display and write access due to the following reasons. First, when the decoded reception images are sequentially written in the display memory, contention occurs between the write timings and read timings of the display system, thereby making it difficult to perform proper timing control. Second, when a multiport DRAM is used as a frame memory, the contention between the read and write timings can be prevented. However, a display image is gradually changed from its end with the progress of write access of the reception image, thereby degrading readability of the image.

There is also available a method of preventing a horizontal line from being displayed on the screen by completing switching of the two frame memories within a vertical blanking period.

In the above conventional methods, in order to perform partial transmission for updating part of the image currently displayed on the screen, data corresponding to the currently displayed image must be read out from the frame memory. Only the data subjected to partial transmission is updated, and the updated data must be written in the write frame memory. Even if a partial transmission area is very small, transmission of the data of the entire display area must be transferred, resulting in a long transfer period and a waste of time. For example, in a high definition television, assume that R, G, and B components are simultaneously transmitted. Even if DMA (Direct Memory Access) hardware is added, transmission of the entire frame by the existing circuit elements requires about 0.8 sec. More specifically, the total transfer time is 794 ms ($=1920\times 1035\times 200\text{ ns}\times 2$) when the number of horizontal pixels is 1,920, the number of vertical pixels is 1,035, a DRAM parallel port cycle time is 200 ns, and the number of read and write cycles is 2.

When a processor such as a DSP (Digital Signal Processor) in a compressed image decoder performs transmission of the entire image or frame without using DMA hardware, a total transmission time is undesirably prolonged several times, thus resulting in impractical applications.

SUMMARY OF THE INVENTION

It is an object of the present invention to provide an image processing apparatus capable of performing high-speed data transfer.

It is another object of the present invention to provide an image processing apparatus capable of accurately performing high-speed data transfer.

It is still another object of the present invention-to provide an image processing apparatus capable of transferring data of only a desired area.

It is still another object of the present invention to provide an image reception apparatus capable of performing high-speed data reception when data is received in a partial transmission mode.

Under these objects of the present invention, there is disclosed an image reception/reproduction apparatus for reproducing an image from image information received from a transmission medium or a recording medium, comprising at least two frame memory means consisting of serial port random access memories, and memory control means for writing, in the other frame memory means, a signal read out from one frame memory means through a serial port at a video rate, wherein all contents of one frame memory can be copied to the other frame memory within a one-frame period. Even if the reception image is partially updated, an image can be obtained that is updated within a period obtained by adding a one-frame intermemory copy period to a period required for transmitting the updated portion.

The above and other objects, features, and advantages of the present invention will be apparent from the detailed description of preferred embodiments in conjunction with the accompanying drawings.

DETAILED DESCRIPTION OF THE PREFERRED EMBODIMENTS

Preferred embodiments of the present invention will be described in detail with reference to the accompanying drawings.

Figure 1:
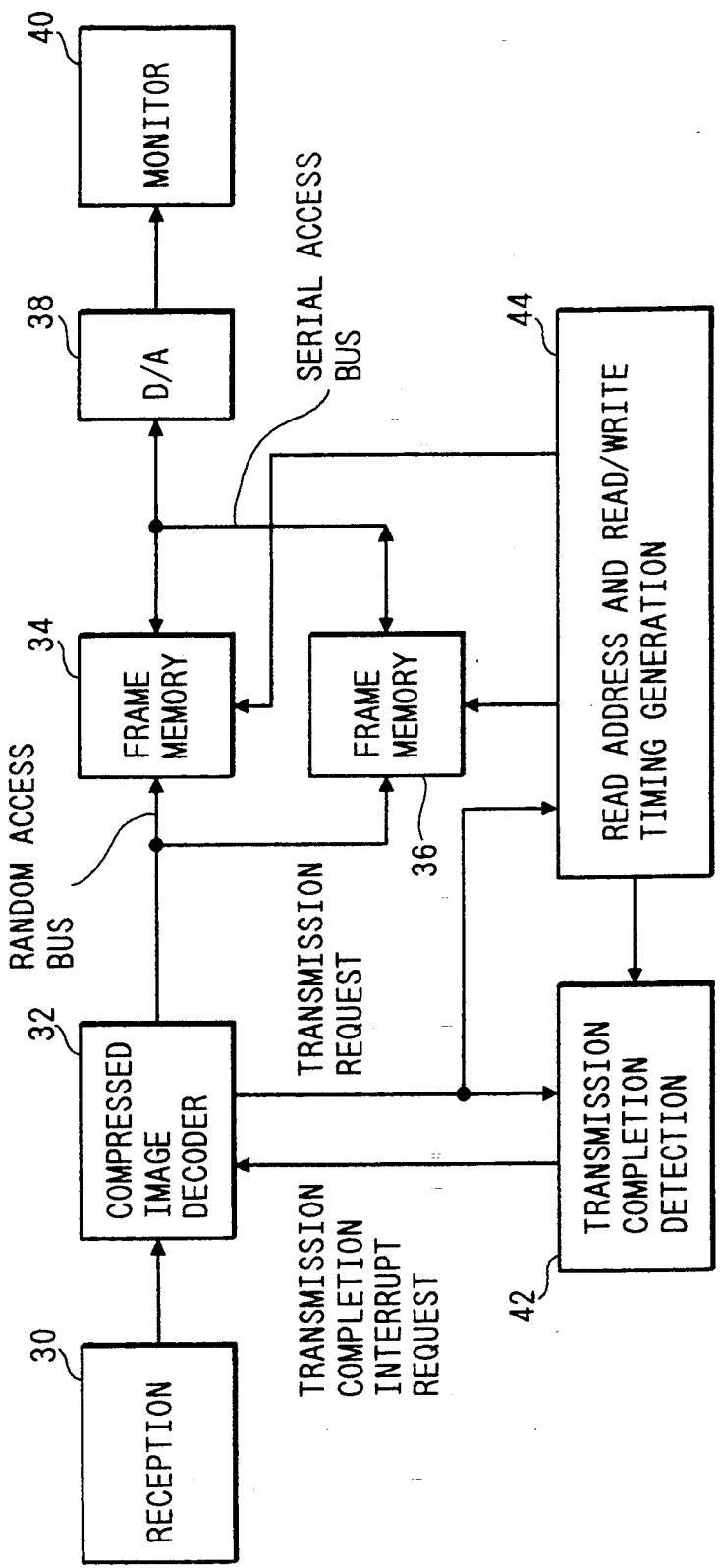
FIG. 1 is a block diagram showing an arrangement according to an embodiment of the present invention.

FIG. 1 is a block diagram showing an arrangement according to an embodiment of the present invention. A reception circuit 30 converts processed transmission image information from a satellite channel or a communication channel into a compressed digital signal. A compressed image decoder 32 sequentially decodes outputs from the reception circuit 30 to expand and restore an original image signal. The decoder 32 determines a code representing a start of partial transmission from the received data. When the code is determined, the decoder 32 outputs a transmission request to a read address and read/write timing generation circuit 44. Frame memories 34 and 36 comprise e multiport DRAM having a serial port capable of performing relatively high-speed access (about 30 ns). When a reception image is being written in one frame memory, the other frame memory is used as an image display memory. Image data read out from the image display frame memory through a serial bus at a video rate is converted into an analog signal by a D/A converter 38. A sync signal is added to the analog signal, and the resultant data is supplied to a monitor 40.

A transmission completion detection circuit 42 includes a register and a comparator, both of which are used to store scanning line numbers and to compare them. In high definition television, since the number of scanning lines is 1,125, this detection circuit includes an 11-bit register and a comparator. More specifically, the detection circuit 42 includes a counter for counting 1,125 scanning lines and a comparator for determining in accordance with an output from the counter whether data of 1,125 scanning lines is completely transmitted. The read address and read/write timing generation circuit 44 generates read addresses for the frame memories 34 and 36 and read/write timing signals therefor.

Described below is an operation for partially updating the storage content of the frame memory 34 in accordance with a transmission format called partial transmission in which the frame memory 34 is used for image display and a reception image signal is written in the frame memory 36.

When the compressed image decoder 32 receives data representing that partial transmission is started, the compressed image decoder 32 outputs an instruction for transmission between the frame memories to the read address and read/write timing generation circuit 44 and the transmission completion detection circuit 42. In response to this instruction, the read address and read/write timing generation circuit 44 sets the frame memory 36 in a write transfer mode, i.e., a transfer mode of write access from the serial bus. The transmission completion detection circuit 42 holds the present scanning line number. In this write transfer mode, data read out from the frame memory 34 is immediately written in the frame memory 36. The write address of the frame memory 34 is equal to the read address of the frame memory 34, so that the image data read out from the frame memory 34 is written at the identical address position of the frame memory 36 through the serial bus. When a one-frame period elapses and then the transmission completion detection circuit 42 then detects the same scanning line number as that held previously, the transmission completion detection circuit 42 causes the read address and read/write timing generation circuit 44 to stop outputting a write transfer mode instruction to the frame memory 36, thereby supplying a transmission completion interrupt signal to the compressed image decoder 32. The compressed image decoder 32 detects by this transmission completion interrupt signal that all of the contents of the frame memory 34 are copied in the frame memory 36. The above series of operations are performed simply to copy the contents of the frame memory 34 to the frame memory 36, so that these operations require about a one-frame (33.3 ms) period.

The compressed image decoder 32 expands and restores the partially transmitted image and overwrites this image at a corresponding storage position of the frame memory 36. The frame memory 36 is switched to a display frame memory in accordance with a transmission instruction. Even in the partial transmission mode, the display image prior to partial transmission can be immediately switched to an image upon partial transmission.

Figure 2:
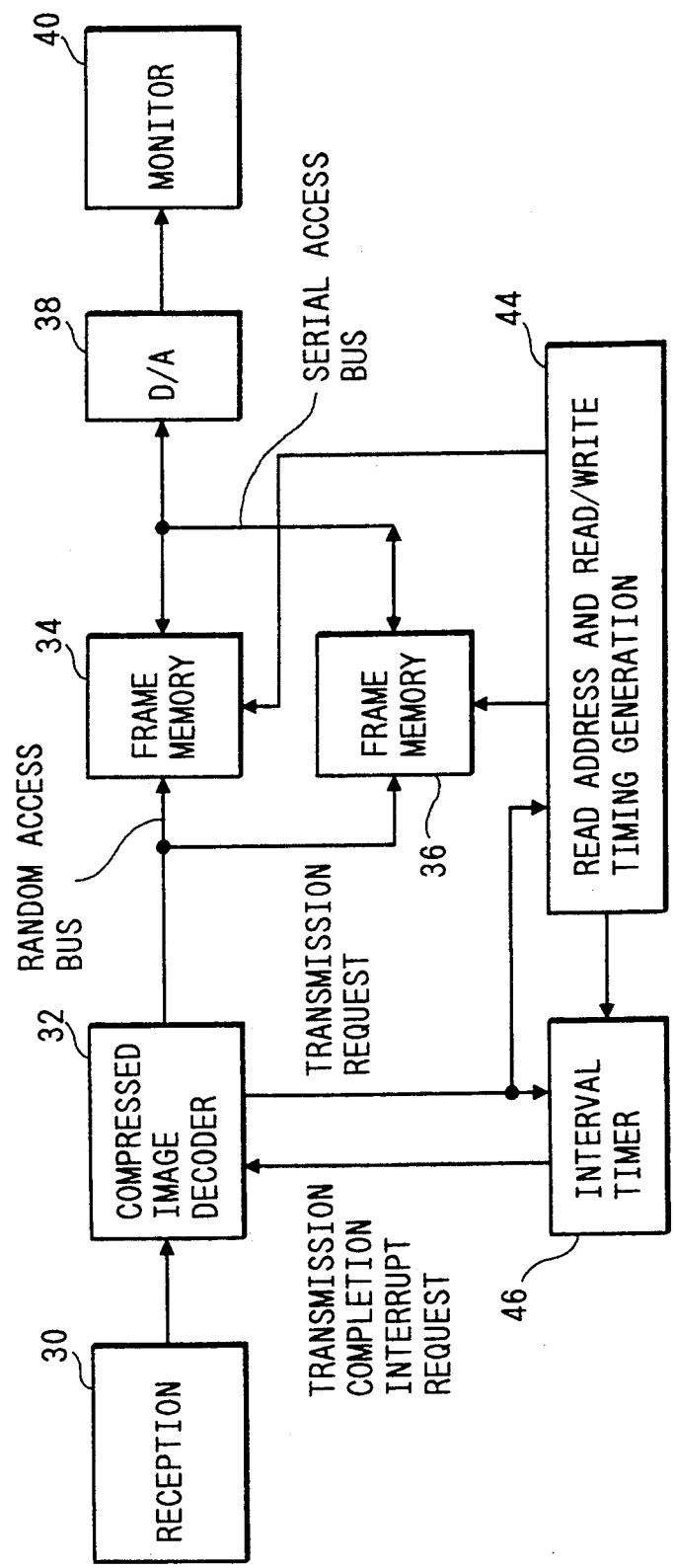
FIG. 2 is a block diagram showing an arrangement according to another embodiment of the present invention.

FIG. 2 is a block diagram showing an arrangement according to another embodiment of the present invention. The same reference numerals as in FIG. 1 denote the same parts in FIG. 2. Since the time required for copying all the contents of the frame memory 34 to the frame memory 36 is the one-frame period, a timer is arranged to generate a transmission completion interrupt request for the compressed image decoder 32 upon a lapse of the one-frame period after receiving a transmission request signal from the compressed image decoder 32. This timer comprises an interval timer 46. More specifically, the transmission completion interrupt request described with reference to FIG. 1 is supplied to the compressed image decoder 32 upon a lapse of the one-frame period.

The arrangements of the frame memories 34 and 36 used in this embodiment will be described below.

Figure 3:
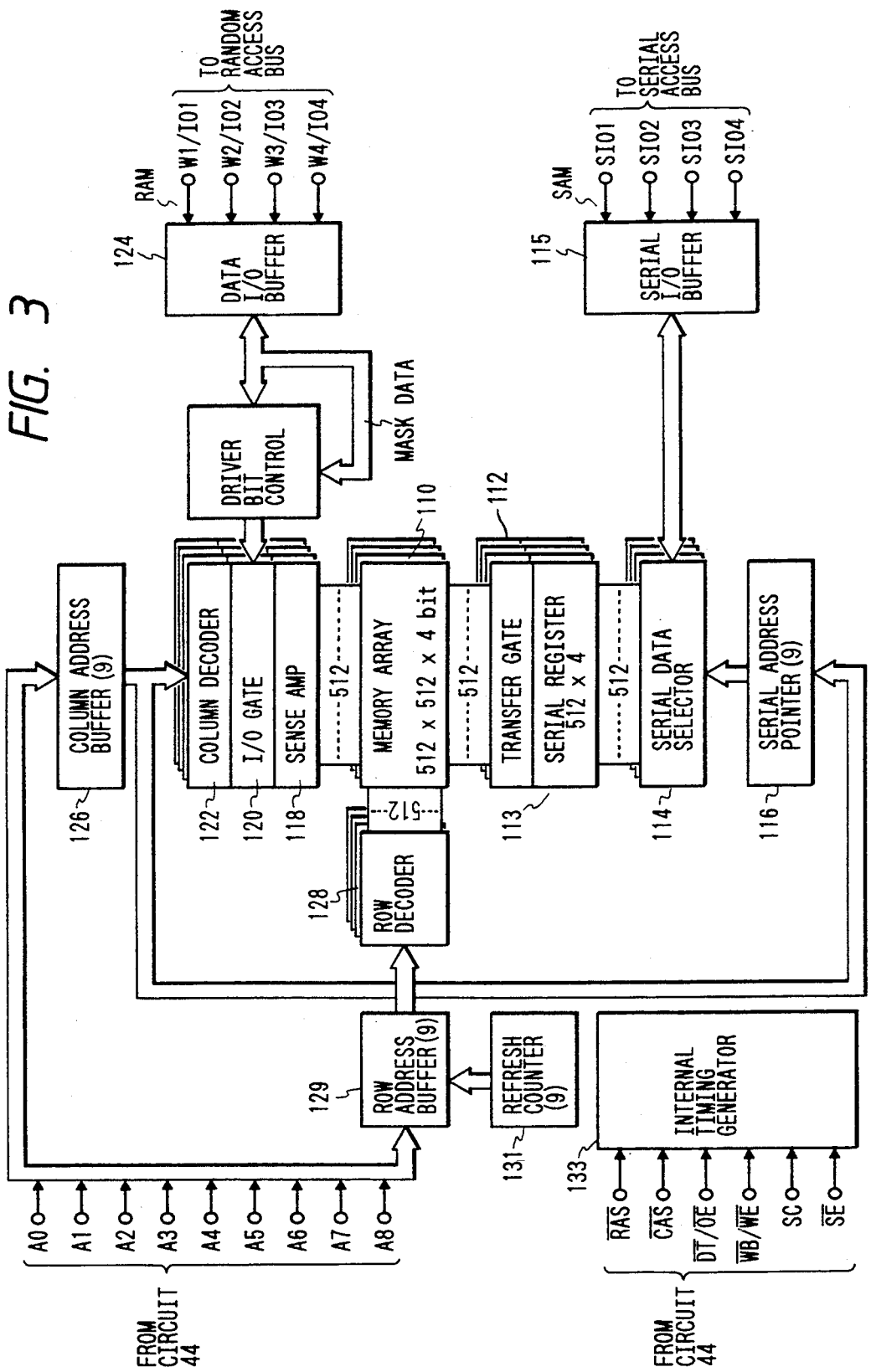
FIG. 3 is a block diagram showing an arrangement of a memory in FIGS. 1 and 2.

FIG. 3 is a block diagram showing an arrangement of the frame memory. Referring to FIG. 3, a TC524256 memory is used as the frame memory. As shown in FIG. 3, a memory array 110 comprises a 1M-bit DRAM having 512 column bits, 512 row bits, and a depth of 4 bits. A transfer gate 112 transfers data between the memory array 110 and a serial register 113 in units of columns. The serial register 113 stores the data transferred by the transfer gate 112. A serial data selector 114 sequentially inputs/outputs data stored in the serial register 113 in accordance with a serial address pointer value. A serial I/O buffer 115 inputs/outputs data output from the selector 114. A serial address pointer 116 automatically updates a start address set by a column address buffer 126. A sense amplifier 118 detects a content of a row set by a row decoder 128 in the memory array 110. An I/O gate 120 performs an input/output operation of an output from the sense amplifier 118 on the basis of the output from the column decoder 122. An I/O buffer 124 inputs/outputs random access data 126 denoted by a column address buffer.

A row decoder 128 decodes a row address stored in a row address buffer 129 to determine a row to be accessed to the memory array 110. The arrangement in FIG. 3 also includes the row address buffer 129 and a refresh counter for determining refresh timing. An internal timing generator 133 controls the respective circuit components of FIG. 3 in accordance with external signals. A signal input to the refresh counter 131 is a row address strobe signal $\overline{RAS}$, a signal $\overline{CAS}$ is a column address strobe signal, a signal $\overline{DT/OE}$ is a data transfer-/output enable signal, a signal $\overline{WB/WE}$ is a write per bit write enable signal, a signal SC is a serial I/O clock signal, and a signal $\overline{SE}$ is a serial enable signal. These signals are generated by the timing generation circuit 44.

In this embodiment, the memory shown in FIG. 3 is used as the memories 34 and 36 shown in FIGS. 1 and 2. A bus connected to the decoder 32 is also connected to the random access port RAM shown in FIG. 3, and the bus connected to the D/A converter 38 is also connected to the serial access port SAM shown in FIG. 3.

The data from the compressed image decoder 32 is input to the port RAM through a random access bus. The image data output to the monitor 40 or transfer data between the memories 34 and 36 is input to the port RAM through the serial access bus.

Figure 4:
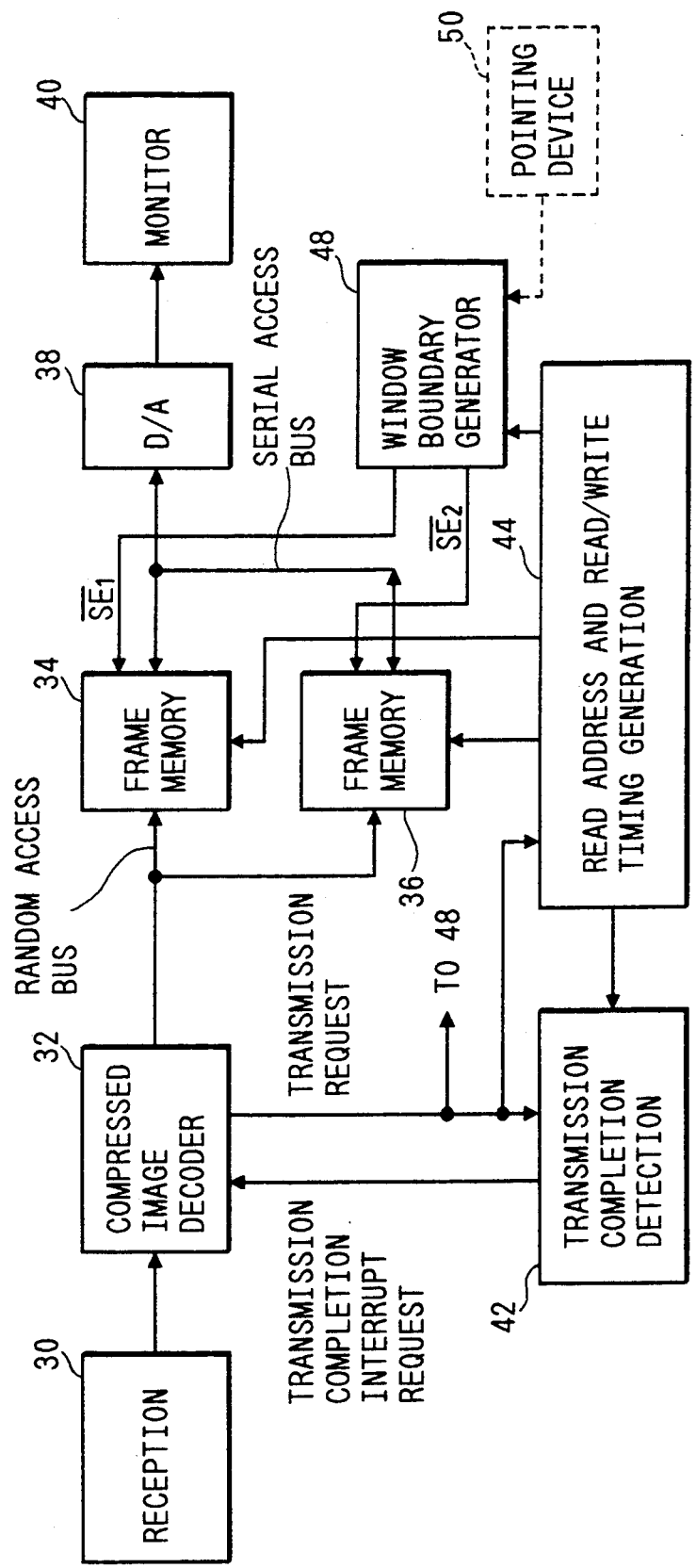
FIG. 4 is a block diagram showing an arrangement according to still another embodiment of the present invention.

Still another embodiment of the present invention will be described below. FIG. 4 is a block diagram of this embodiment. Frame memories 34 and 36 in FIG. 4 are the same as those shown in FIG. 3. This embodiment has a characteristic feature in that a window boundary generator 48 is arranged for generating a serial port enable signal for the memories 34 and 36.

An operation of the embodiment shown in FIG. 4 will be described with reference to FIG. 5.

Figure 5:
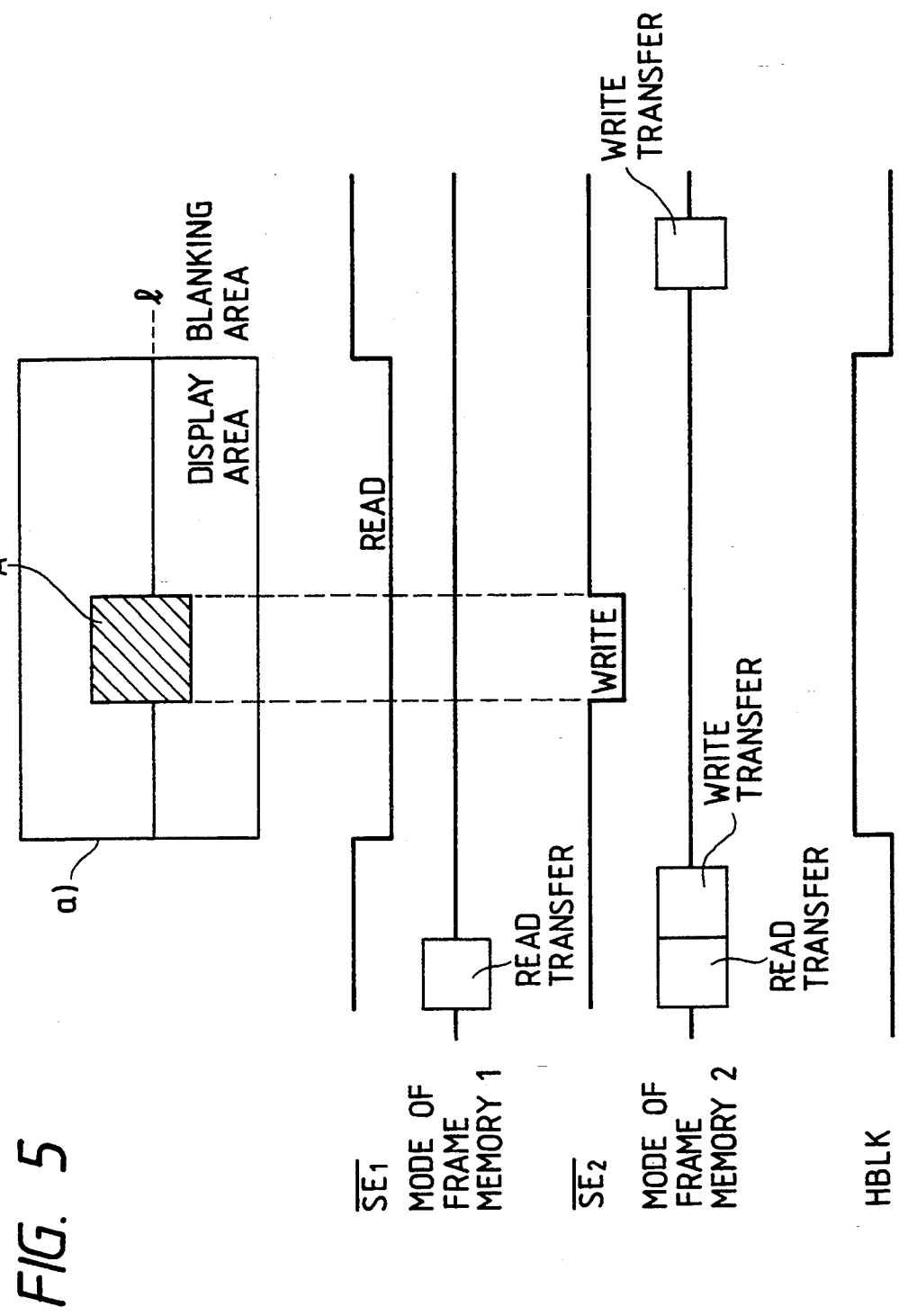
FIG. 5 is a timing chart showing an operation of the embodiment shown in FIG. 4.
Figure 6:
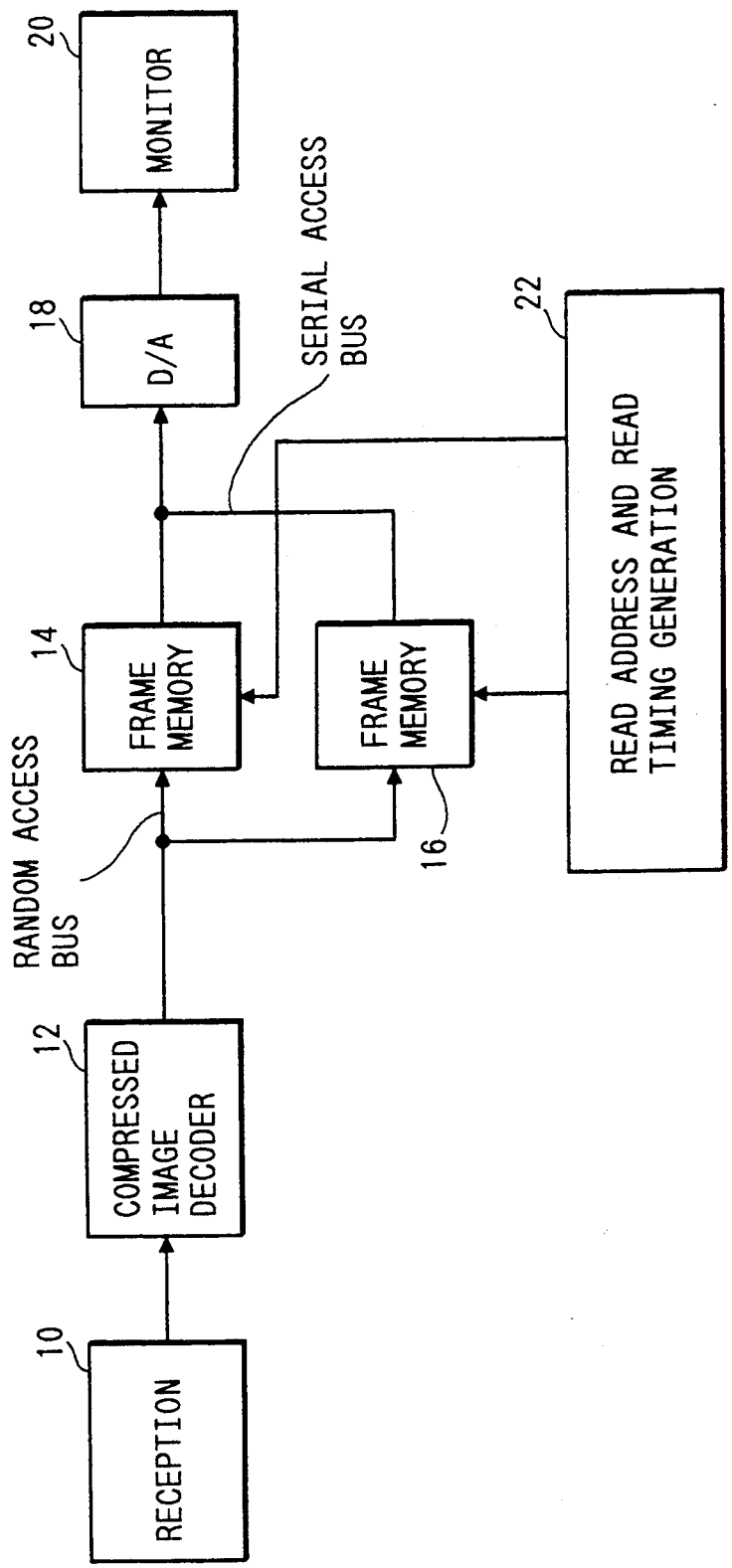
FIG. 6 is a block diagram showing a conventional arrangement.

(a) FIG. 5 illustrates a transfer operation of part of the content of the frame memory 34 to the frame memory 36. An output $\overline{SE1}$ from the generator 48 during read access of the data of the frame memory 34 from the serial port in correspondence with the 1 line of FIG. 5 is output for a period corresponding to an effective image area. A read transfer cycle of a frame memory 1 is performed during an H-BLK period prior to output of the signal SE1. Data of 512×4 bits selected by a row address of the SAM port by this read transfer cycle is transferred to a serial register 113 of the SAM port. After the transfer, SI01 to SI04 are switched to a serial output mode, and serial data output is performed in synchronism with a leading edge of the SC.

Similarly, a read transfer cycle is executed in the memory 36, and data of a predetermined line in the memory cell is stored in the shift register. The write transfer cycle is transferred. The write transfer cycle is a cycle for transferring data of 512×4 bits, stored in the SAM in response to a serial input, to a memory cell selected by a row address of the RAM port. After this cycle, since SI01 to SI04 are set in the serial input mode, serial data input is performed in synchronism with the leading end of the SC.

In order to update the data of an area to be copied to the memory 36, the state of a signal $\overline{SE2}$ is changed for only a hatched area in FIG. 5. Only the hatched portion of the content of the memory 34 is copied in the memory 36.

By using the partial transmission mode described above, highly flexible image editing can be performed. For example, a window can be set while the content of the frame memory 34 is being displayed; another image can be overlapped, an overlapped state can be canceled, and then the original image can be restored; and the same image within a set window can be copied in the memory 36 a plurality of times, and a multi-image can be obtained. The window boundary generator 48 may generate the signals $\overline{SE1}$ and $\overline{SE2}$ of FIG. 5 in accordance with designation to the compressed image decoder and designation of an area subjected to window processing with a pointing device indicated by a broken line in FIG. 4.

According to the above embodiments of the present invention, image information received through a broadcast satellite or an optical fiber is exemplified. However, the present invention is applicable to reproduction and display of image information compressed and recorded in a large-capacity recording medium such as an optomangetic disk.

As can be readily understood from the above description, according to the above embodiments, when a reception image is to be partially updated and a portion to be updated is very small, an updated image can be obtained within a short period of time.

What is claimed is:

1. An image processing apparatus comprising:
   first and second memories each having a random access port, image data being written in said first and second memories through the random access ports; and
   transferring means for writing the image data read out from said first memory through a serial access port thereof in said second memory through a serial access port thereof, the serial access ports being different from the random access ports and having an access speed higher than that of the random access ports.

2. An apparatus according to claim 1, further comprising means for outputting the image data read out from one of said first and second memories through the serial access port thereof to a monitor.

3. An apparatus according to claim 1, wherein said first and second memories comprise frame memories, respectively.

4. An apparatus according to claim 1, further comprising decoding means for decoding nondecoded data and supplying the decoded data to one of said first and second memories through the random access port thereof.

5. An apparatus according to claim 1, further comprising control means for controlling said transferring means in accordance with an external input.

6. An apparatus according to claim 5, wherein said control means comprises means for causing said transferring means to start reading and writing of the image data through the serial access ports in accordance with the external input.

7. An image processing apparatus comprising:
   frame memories each having a random access port; and
   memory control means for writing a signal read out from one of said frame memories through a serial access port thereof in another of said frame memories through a serial access port thereof, the serial access ports being different from the random access ports and having an access speed higher than that of the random access ports.

8. An apparatus according to claim 7, further comprising means for outputting the signal read out from the one of said frame memories through a serial port thereof to a monitor.

9. An apparatus according to claim 7, further comprising means for supplying decoded data to one of said frame memories through the random access port thereof while decoding nondecoded data.

10. An apparatus according to claim 7, further comprising control means for controlling said memory control means in accordance with an external input.

11. An apparatus according to claim 10, wherein said control means causes said memory control means to perform reading and writing of the signal through the serial access ports in accordance with the external input.

12. An image reception/reproduction apparatus comprising:
   means for receiving external compressed data;
   means for expanding data including image data received by said receiving means;
   first writing means for writing the expanded image data in a first memory through a random access port thereof; and
   second writing means for writing the image data read out from said first memory through a serial access port thereof in a second memory through a serial access port thereof, the serial access port of the first memory being different from the random access port and has an access speed higher than that of the random access port.

13. An apparatus according to claim 12, wherein said first memory and said second memory bidirectionally transfer data through the serial ports thereof.

14. An apparatus according to claim 12, further comprising control means for controlling said second writing means.

15. An apparatus according to claim 14, wherein said control means writes the image data stored in said first memory in said second memory through the serial ports in accordance with data expanded by said expanding means.

16. An apparatus according to claim 15, wherein the expanded data includes data representing a start of partial image transmission.

17. An apparatus according to claim 12, further comprising means for supplying the image data read out from the second memory through the serial port thereof to a monitor.

* * * * *

UNITED STATES PATENT AND TRADEMARK OFFICE
CERTIFICATE OF CORRECTION

PATENT NO. : 5,438,376
DATED : August 1, 1995
INVENTOR(S) : Ikuo Watanabe

It is certified that error appears in the above-indentified patent and that said Letters Patent is hereby corrected as shown below:

Col. 1, line 7.   Change "07/627,618" to -- 07/627,018 --.

Col. 1, line 33.  Delete "1".

Col. 1, line 36.  After "14" insert -- , --.

Col. 4, line 2.   Delete "then".

Col. 4, line 3.   Delete "then".

Col. 5, line 35.  Change "1" to -- $\lambda$ --.

Col. 6, line 13.  Change "mangetic" to -- magnetic --.

Signed and Sealed this

Fifth Day of December, 1995

Attest:

BRUCE LEHMAN

*Attesting Officer*        *Commissioner of Patents and Trademarks*